(12) United States Patent
Morita et al.

(10) Patent No.: US 9,054,541 B2
(45) Date of Patent: Jun. 9, 2015

(54) PORTABLE POWER SOURCE APPARATUS CAPABLE OF HOLDING CIRCULAR CYLINDRICAL BATTERIES

(75) Inventors: Hideyo Morita, Minamiawaji (JP); Hiroshi Nagamine, Sumoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 1198 days.

(21) Appl. No.: 12/915,554

(22) Filed: Oct. 29, 2010

(65) Prior Publication Data
US 2011/0104522 A1    May 5, 2011

(30) Foreign Application Priority Data
Oct. 31, 2009    (JP) .................. 2009-251556

(51) Int. Cl.
*H01M 2/10*    (2006.01)
*H02J 7/00*    (2006.01)

(52) U.S. Cl.
CPC .......... *H02J 7/0044* (2013.01); *H01M 2/1022* (2013.01)

(58) Field of Classification Search
CPC .. H01M 2/1016; H01M 2/1022; H01M 2/105
USPC .................................. 429/96–100
See application file for complete search history.

(56) References Cited

U.S. PATENT DOCUMENTS

| 2006/0108979 A1* | 5/2006 | Daniel et al. ............. 320/112 |
| 2007/0182363 A1* | 8/2007 | Yang ...................... 320/107 |
| 2007/0279902 A1* | 12/2007 | Kim ...................... 362/202 |
| 2009/0011286 A1* | 1/2009 | Liu ......................... 429/7 |

FOREIGN PATENT DOCUMENTS

JP    2002-27674    1/2002

* cited by examiner

*Primary Examiner* — Jonathan G Leong
(74) *Attorney, Agent, or Firm* — Wenderoth, Lind & Ponack, L.L.P.

(57) ABSTRACT

A portable power source apparatus has a closing surface (21) facing an open end of a main case (10) and an exposed surface (22) externally exposed at an opposite end of a cap section (20) from the closing surface; a planar circuit board (38) housed in the cap section with voltage conversion circuitry for converting the voltage of the circular cylindrical batteries CB contained in the main case; and a power supply terminal (50) disposed in the exposed surface of the cap section and capable of outputting power from the circular cylindrical batteries CB contained in the main case. The circuit board is disposed diametrically across a circular cross-section of the cap section, and a pair of ribs (42) is provided approximately perpendicular to the circuit board.

20 Claims, 18 Drawing Sheets

PORTABLE POWER SOURCE APPARATUS CAPABLE OF HOLDING CIRCULAR CYLINDRICAL BATTERIES

BACKGROUND OF THE INVENTION

1. Field of the Invention

The present invention relates to a portable power source apparatus capable of holding circular cylindrical batteries, and for example, relates to a portable power source apparatus such as an emergency charging device equipped with a power source connector that supplies power to electronic equipment.

2. Description of the Related Art

Along with the popularity of portable electronic devices such as mobile phones and portable music players, instances where the batteries run out of charge after departure to an external destination have become common. In these situations there is a need for recharging, and emergency charging devices (also called emergency chargers, emergency re-chargers, portable emergency power packs, boosters, etc.) have been developed (for example, Japanese Laid-Open Patent Publication 2002-27674) to allow portable electronic equipment to be charged even when commercial power is locally unavailable.

Many of these types of emergency charging devices contain specially-adapted batteries. However, such a configuration makes it necessary to charge the emergency charging device in advance, and problems such as insufficient discharge capacity at the destination, or forgetting to charge the charging device can prevent its use.

To resolve these types of problems, an emergency charging device has been conceived that contains readily exchangeable off-the-shelf batteries such as AA-batteries or AAA-batteries. For example, by using rechargeable batteries such as nickel hydride batteries or nickel cadmium batteries, the batteries can be reused. In addition, even if the batteries run out of charge capacity, spare rechargeable batteries can be carried along or purchased at the destination to augment charging capacity.

Along with the distribution of this type of emergency charging device, demand for more portability of the charging device itself has developed. Specifically, it has become necessary to make even the emergency charging device conveniently portable, lightweight, and as small as possible. However, when the charging device is made smaller, protection of the internal batteries can become insufficient with associated weak points such as a case that can easily be damaged and batteries that can easily be short circuited

SUMMARY OF THE INVENTION

The present invention was developed with the object of resolving the problems described above. Thus, it is a primary object of the present invention to provide a portable power source apparatus capable of holding circular cylindrical batteries that can be miniaturized while maintaining sufficient mechanical strength.

To achieve the object described above, a portable power source apparatus capable of holding circular cylindrical batteries for the first aspect of the present invention can be provided with a circular cylindrical main case 10 open at one end, having a bottom, made with an outside diameter only slightly larger than a circular cylindrical battery CB, and capable of holding a plurality of circular cylindrical batteries CB that extend lengthwise, are stacked in the lengthwise direction, and are connected in series; an approximately circular cylindrical cap section 20 that closes-off the open end of the main case 10 in a removable manner, and is provided with a closing surface 21 facing the open end of the main case 10 and an exposed surface 22 externally exposed at the opposite end of the cap section 20 from the closing surface 21; a planar circuit board 38 housed in the cap section 20 with voltage conversion circuitry mounted on-board to convert the voltage of the circular cylindrical batteries CB contained in the main case 10; and a power supply terminal 50 disposed in the exposed surface 22 of the cap section 20 and capable of outputting power from the circular cylindrical batteries CB contained in the main case 10. The circuit board 38 can be disposed across the inside diameter of a circular cross-section of the cap section 20, and a pair of ribs 42 can be provided approximately perpendicular to the circuit board 38. With this structure, the outside diameter of the cap section 20 can be restrained to approximately the same size as the circular cylindrical batteries while housing a relatively large circuit board disposed across the diameter of the cap section. Further, by disposing a pair of ribs perpendicular to the circuit board to support the circuit board from the backside, the ability to withstand impact forces can be improved.

A portable power source apparatus capable of holding circular cylindrical batteries for the second aspect of the present invention can be provided with a circuit board holder 40 inside the cap section 20 to retain the circuit board 38 in a set disposition. The circuit board holder 40 can have a box-shape that extends in a direction approximately perpendicular to the plane of the circuit board 38 and can be provided with the pair of ribs 42 mentioned previously. With this structure, the circuit board and supporting circuit board holder are disposed in a perpendicular arrangement inside the cap section. As a result, cap section robustness can be improved while efficiently utilizing the space inside the cap section.

A portable power source apparatus capable of holding circular cylindrical batteries for the third aspect of the present invention can be provided with a conducting lead-plate 30 that contacts the circular cylindrical battery CB electrode furthest away from the cap section 20 to electrically connect that electrode to the circuit board 38. The main case 10 can be divided into an upper case 13 and a lower case 14, the upper case 13 and the lower case 14 can be formed from insulating material, and the lead-plate 30 can be disposed at the junction of the upper case 13 and the lower case 14 in an orientation perpendicular to the interface plane of the junction. With this structure, since the lead-plate that establishes electrical connection of the circular cylindrical batteries also functions as a perpendicular support rib at the junction between the upper case and the lower case, the lead-plate can contribute to improving the strength of the junction. Further, since there is no need to allot space to run the lead-plate inside the main case, this configuration can serve to reduce the size of the portable power source apparatus.

A portable power source apparatus capable of holding circular cylindrical batteries for the fourth aspect of the present invention can have a main case 10 provided with an outer case 11 that covers the outside of an inner case 12 made up of the upper case 13 and the lower case 14, and the outer case 11 can be made of metal. With this structure, the inner surface of the main case can be insulating to prevent malfunctions such as circular cylindrical battery short circuits while improving strength and long-term durability with a metal exterior.

A portable power source apparatus capable of holding circular cylindrical batteries for the fifth aspect of the present invention can have a power supply terminal 50 that is a standardized power supply connector (meeting the specifications of the standard). As a result, power can be supplied to widely used electronic equipment provided with a terminal that can connect with a standardized or specified terminal such as a USB terminal or a mobile phone charging terminal.

A portable power source apparatus capable of holding circular cylindrical batteries for the sixth aspect of the present invention can have a power supply terminal 50 that is a USB terminal. As a result, power can be supplied to electronic equipment that can be powered via a common USB terminal.

A portable power source apparatus capable of holding circular cylindrical batteries for the seventh aspect of the present invention can have the power supply terminal 50 in a rectangular opening along a diameter of the exposed region of the cap section 20. Consequently, when an electronic equipment plug is inserted in the power supply terminal of the portable power source apparatus to connect those devices, the circular cylindrical portable power source apparatus is prevented from rolling along a supporting surface, and the connected unit can be stably placed even on a slightly inclined surface.

A portable power source apparatus capable of holding circular cylindrical batteries for the eighth aspect of the present invention can have a power supply terminal 50 that is a power supply connector extended from the exposed surface 22 of the cap section 20 via a cable 52. With this structure, handling and connection is made easier by extension of the connector via a cable, and this structure is also suitable in cases such as when it is difficult to directly plug and unplug the portable power source apparatus in the electronic equipment.

A portable power source apparatus capable of holding circular cylindrical batteries for the ninth aspect of the present invention can be provided with a power switch 26 on the lateral surface of the circular cylindrical cap section 20. The power switch 26 can operate to begin supplying power from the power supply terminal 50 at a voltage converted from the circular cylindrical battery CB voltage by the voltage conversion circuitry. As a result, the supply of power can be initiated at the desired time, and power consumption waste can be avoided.

A portable power source apparatus capable of holding circular cylindrical batteries for the tenth aspect of the present invention can have voltage conversion circuitry mounted on the circuit board 38 that is a DC/DC converter. Circular cylindrical battery CB output voltage can be stabilized and output by the DC/DC converter. With this structure, the voltage conversion circuitry can be mounted on the circuit board in a compact form.

A portable power source apparatus capable of holding circular cylindrical batteries for the eleventh aspect of the present invention can be provided with circular cylindrical batteries CB that can be charged. Consequently, chargeable circular cylindrical batteries can be loaded in the main case to supply power to the electronic equipment. The above and further objects of the present invention as well as the features thereof will become more apparent from the following detailed description to be made in conjunction with the accompanying drawings.

DETAILED DESCRIPTION OF THE EMBODIMENT(S)

The following describes embodiments of the present invention based on the figures. However, the following embodiments are merely specific examples of a portable power source apparatus capable of holding circular cylindrical batteries representative of the technology associated with the present invention, and the portable power source apparatus capable of holding circular cylindrical batteries of the present invention is not limited to the embodiments described below. Further, for clarity of description, elements shown in the figures may be exaggerated with respect to size, positional relation, etc. In the following descriptions, elements with the same name and label indicate the same element or elements with the same material properties, and their detailed description is abbreviated. The function of a plurality of structural elements of the present invention can be multiply served by a single element, and conversely, a single structural element can be implemented by dividing it into a plurality of elements having the same function. Further, the description of one part of an embodiment may also be used in another embodiment.

Figure 1:
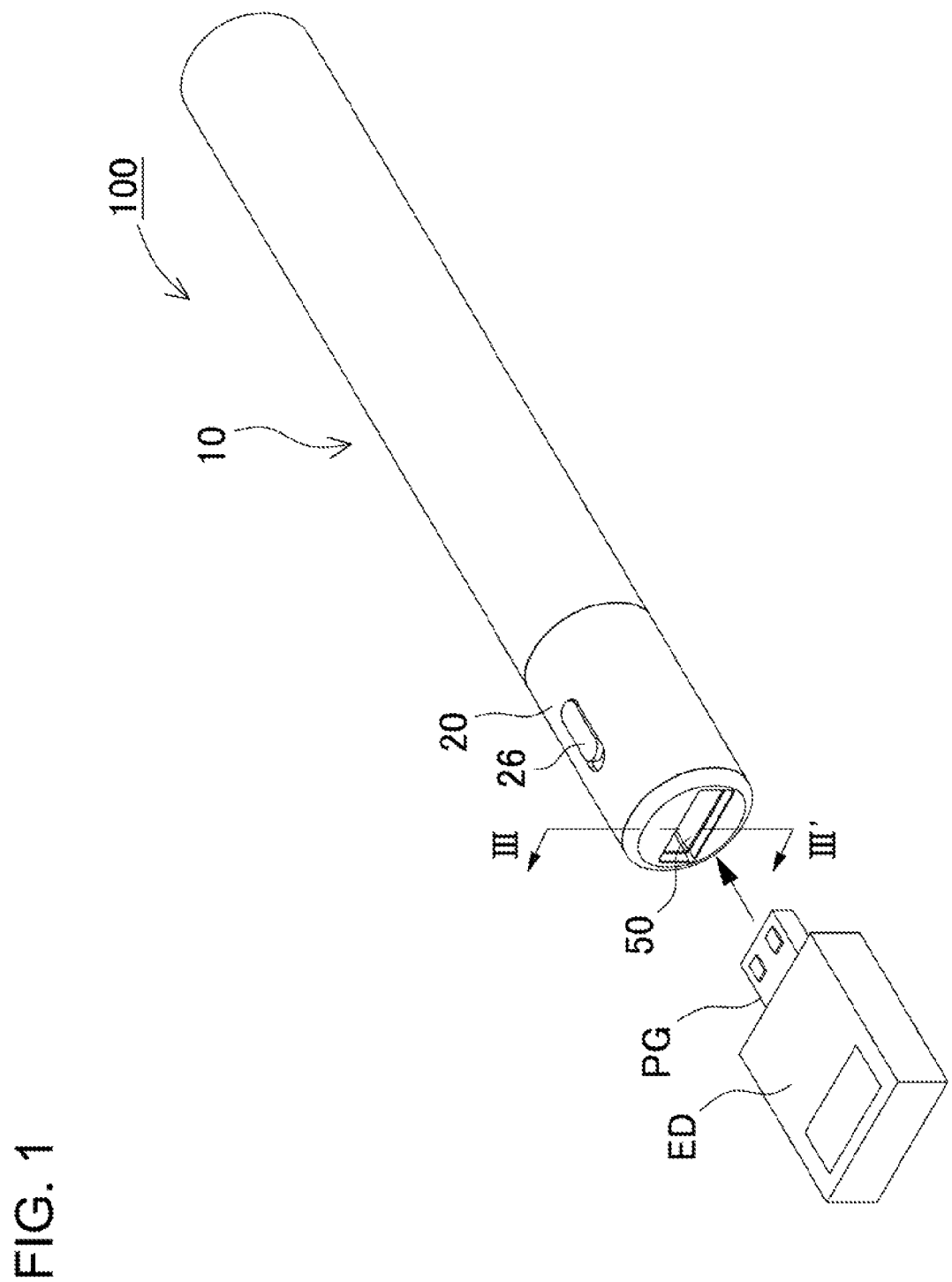
FIG. 1 is a perspective view showing a portable power source apparatus capable of holding circular cylindrical batteries for the first embodiment of the present invention.
Figure 2:
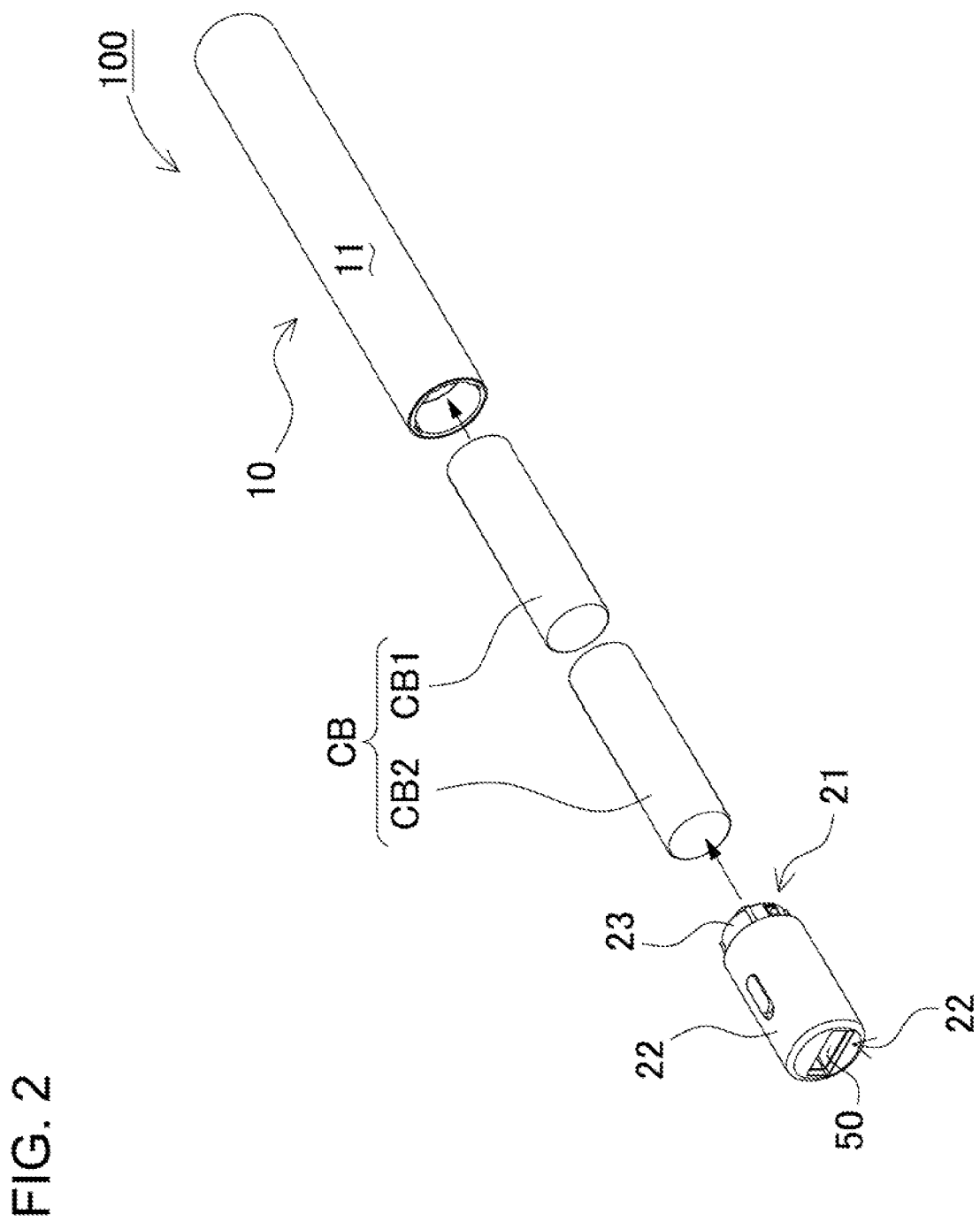
FIG. 2 is an exploded perspective view of the portable power source apparatus of FIG. 1.
Figure 3:
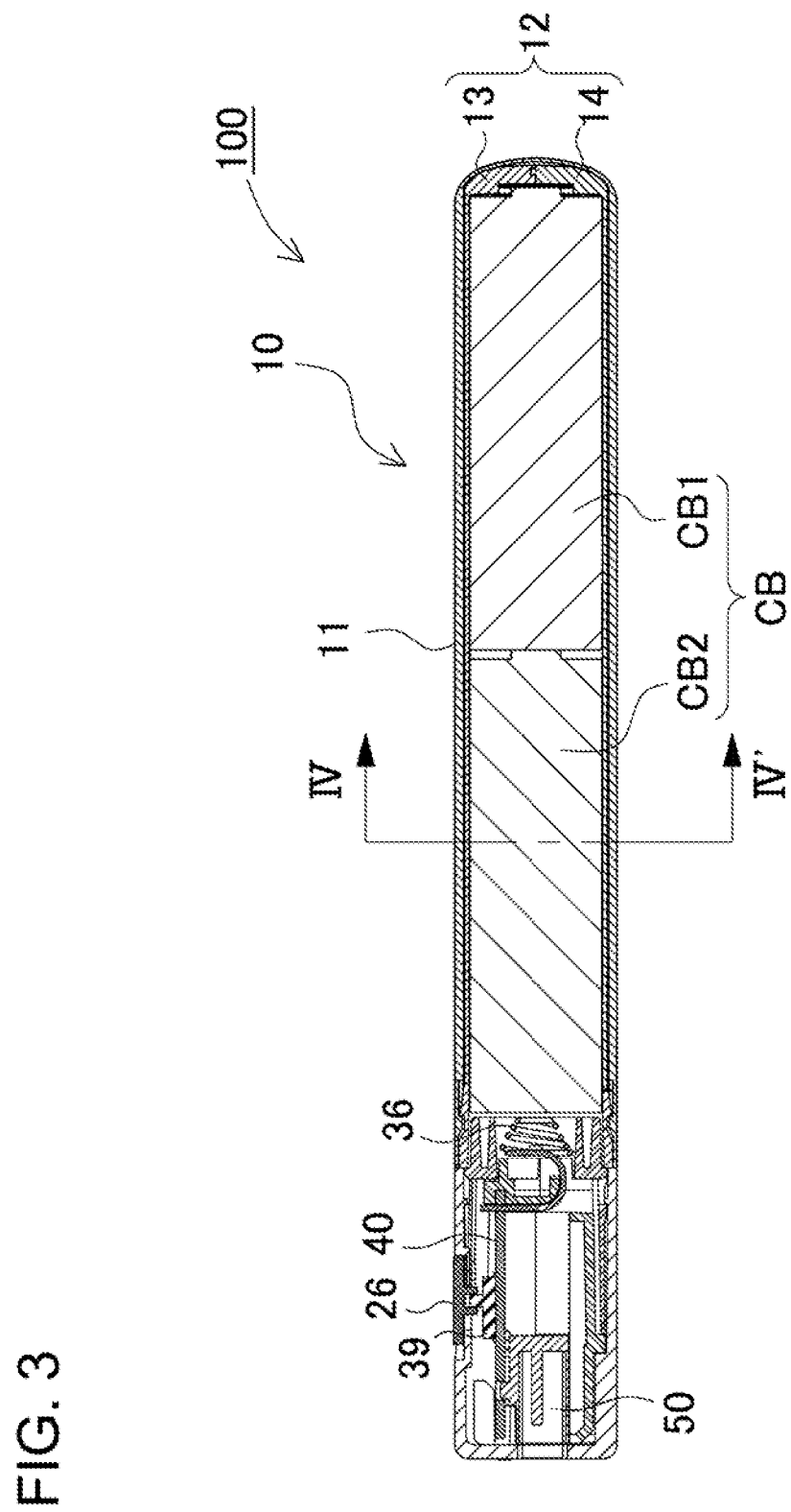
FIG. 3 is a vertical cross-section taken along line III-III of FIG. 1.
Figure 4:
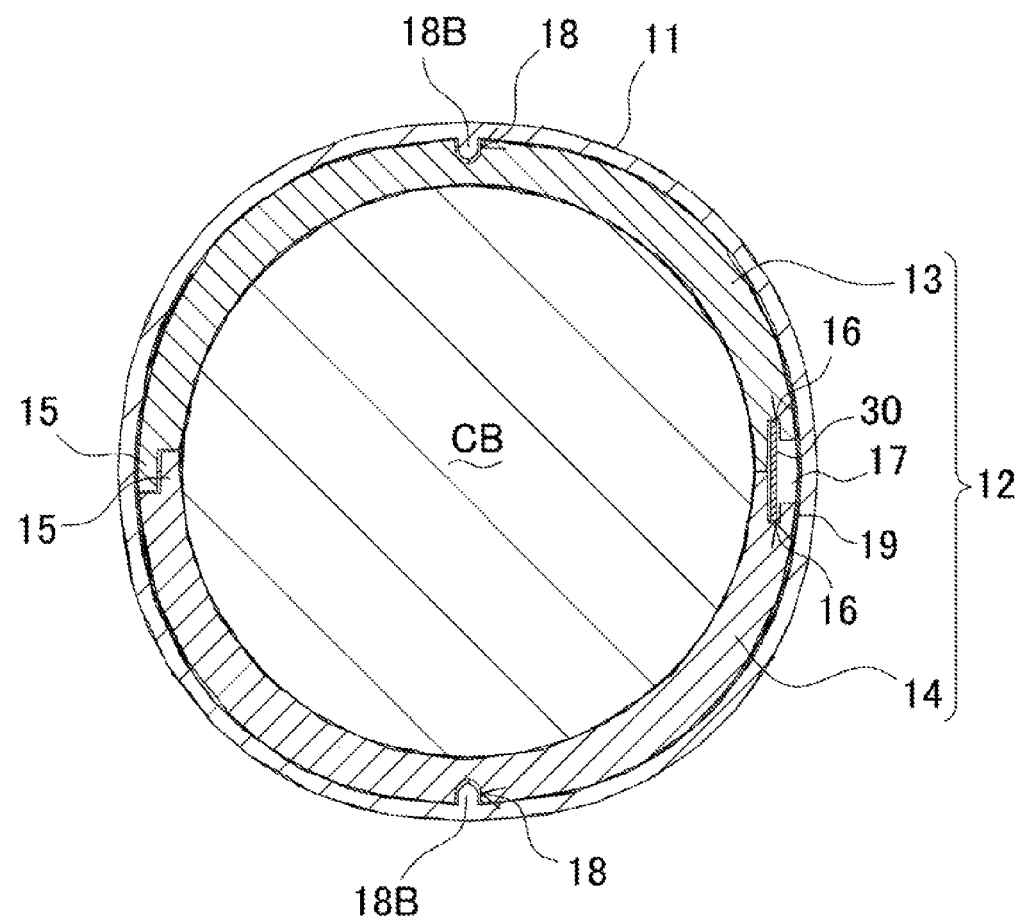
FIG. 4 is a vertical cross-section taken along line IV-IV of FIG. 3.
Figure 5:
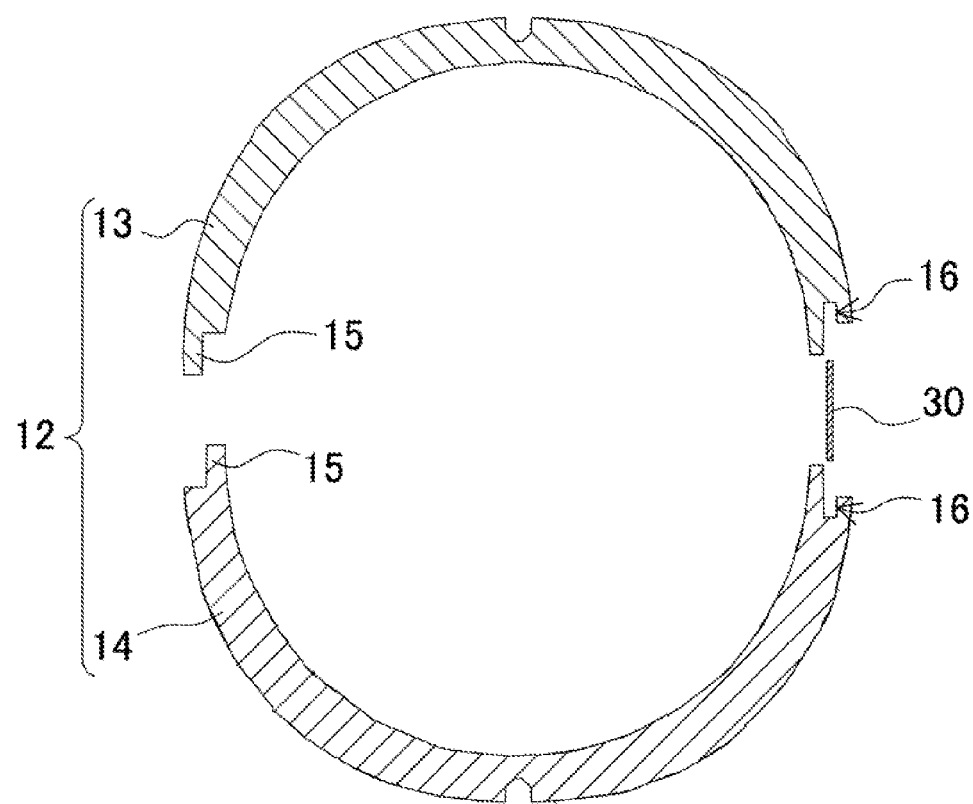
FIG. 5 is a representative exploded view of FIG. 4.
Figure 6:
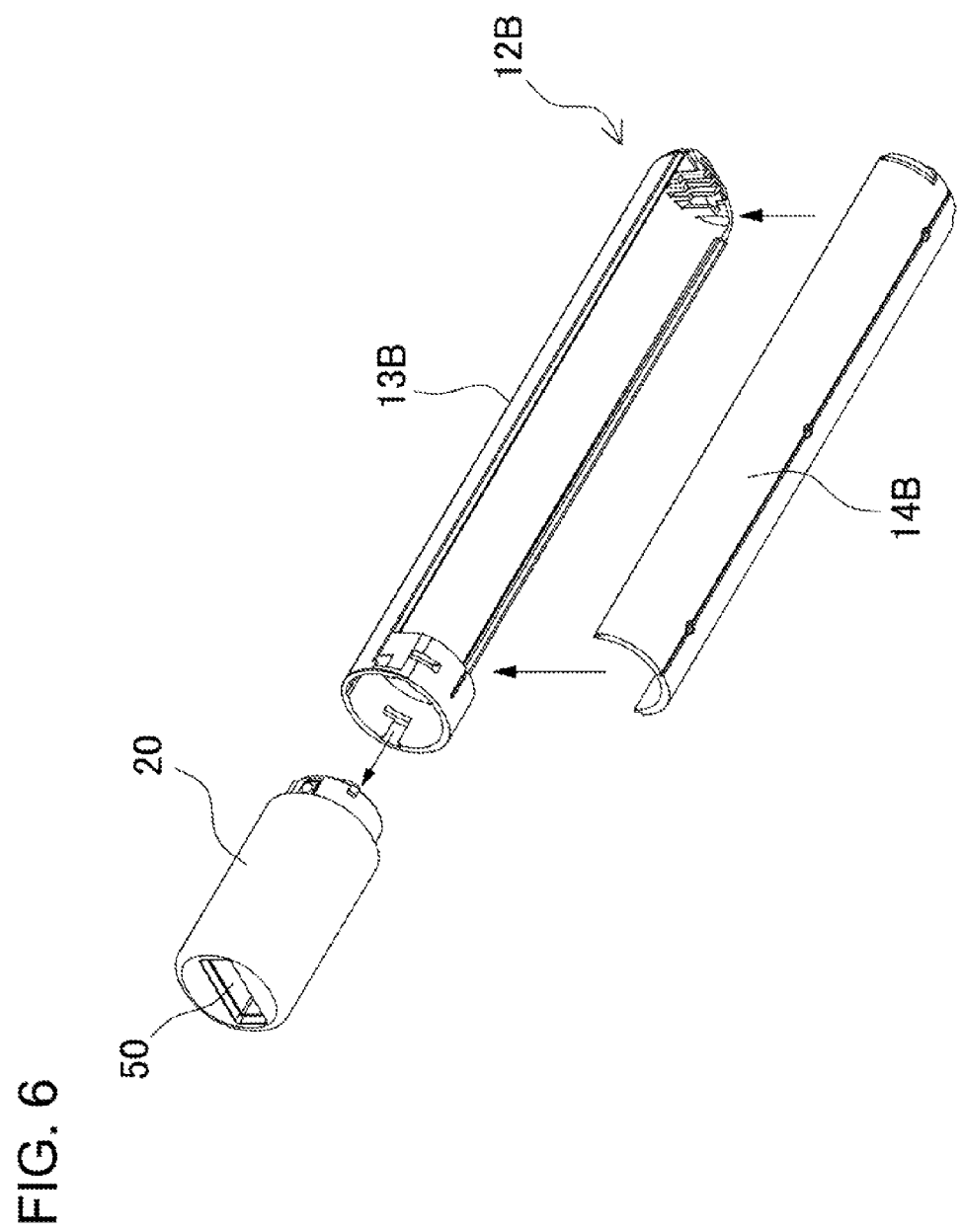
FIG. 6 is an exploded perspective view of the inner case.
Figure 7:
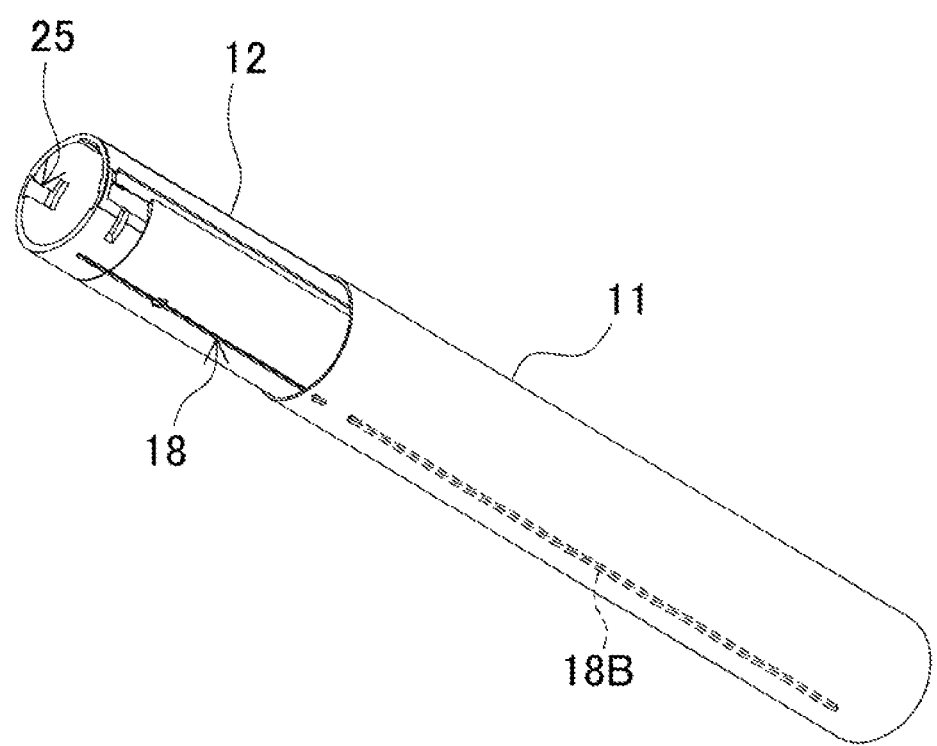
FIG. 7 is a perspective view showing the structure of the inner case inserted in the outer case.
Figure 8:
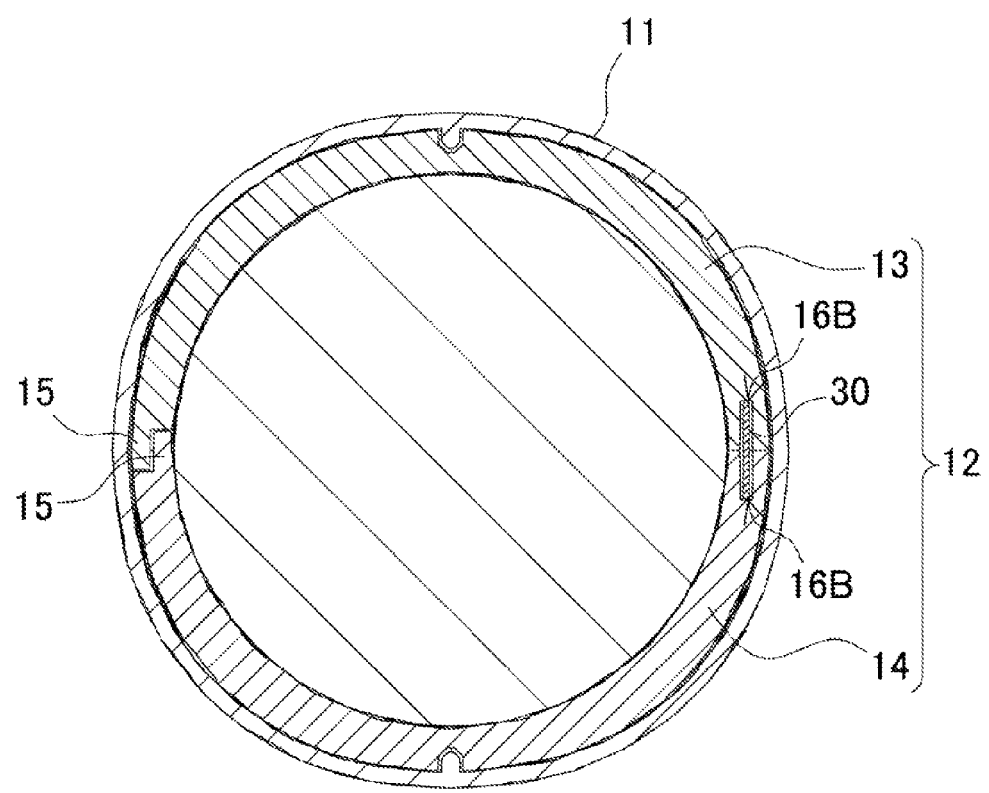
FIG. 8 is a vertical cross-section taken along line IV-IV of FIG. 3 for an embodiment variation.
Figure 9:
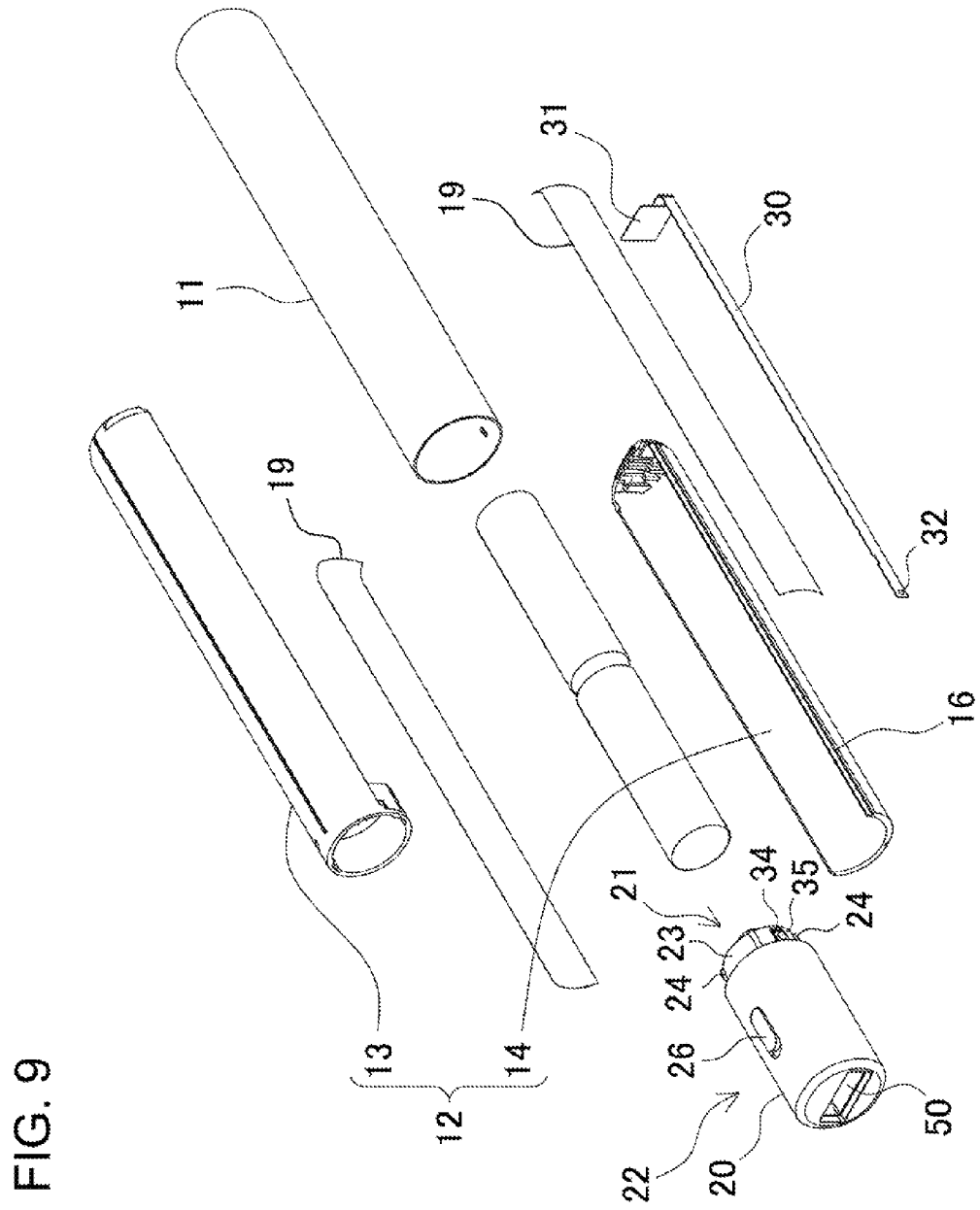
FIG. 9 is an exploded perspective view of the main case of FIG. 2.
Figure 10:
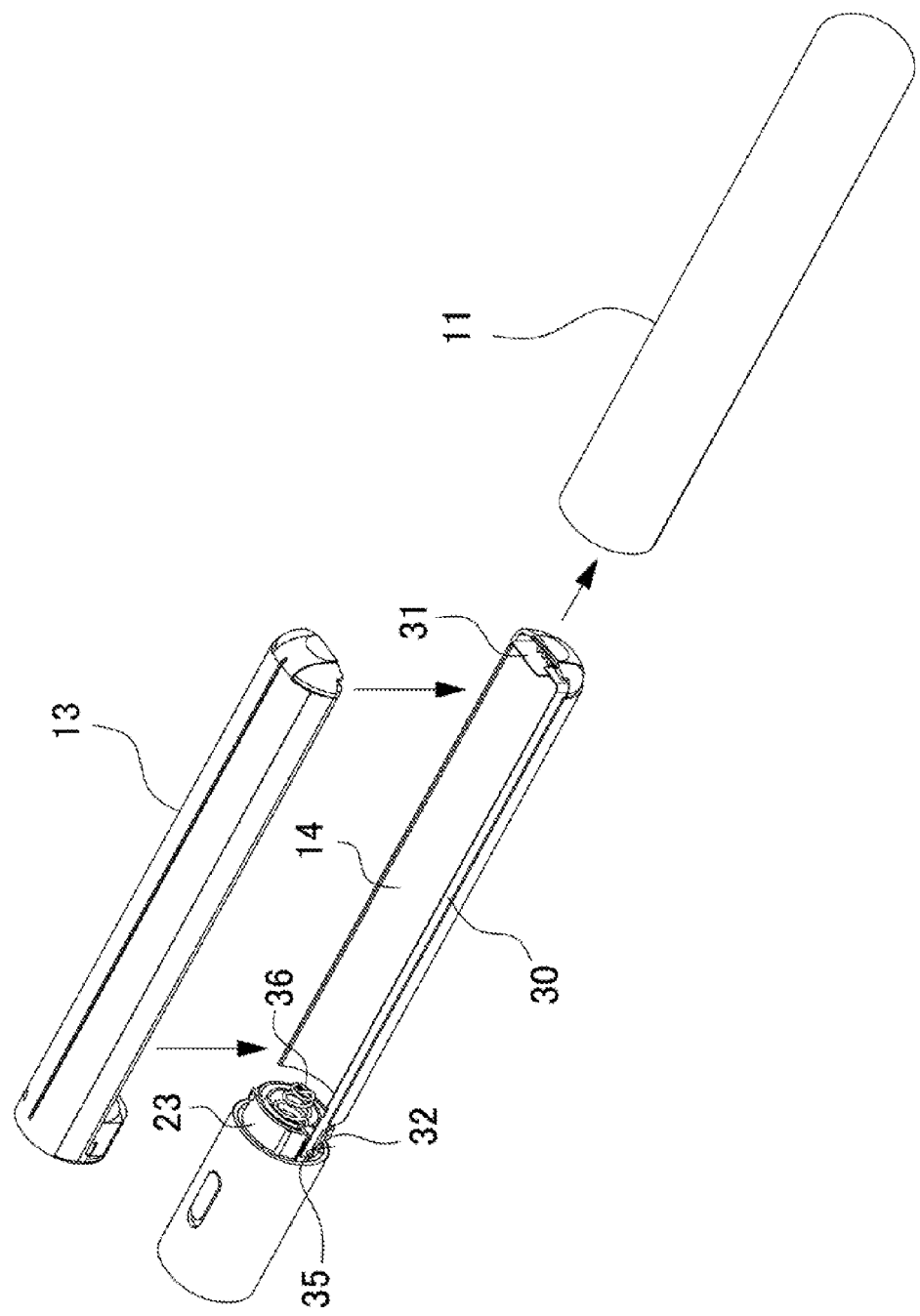
FIG. 10 is an exploded perspective view viewed from above and behind.
Figure 11:
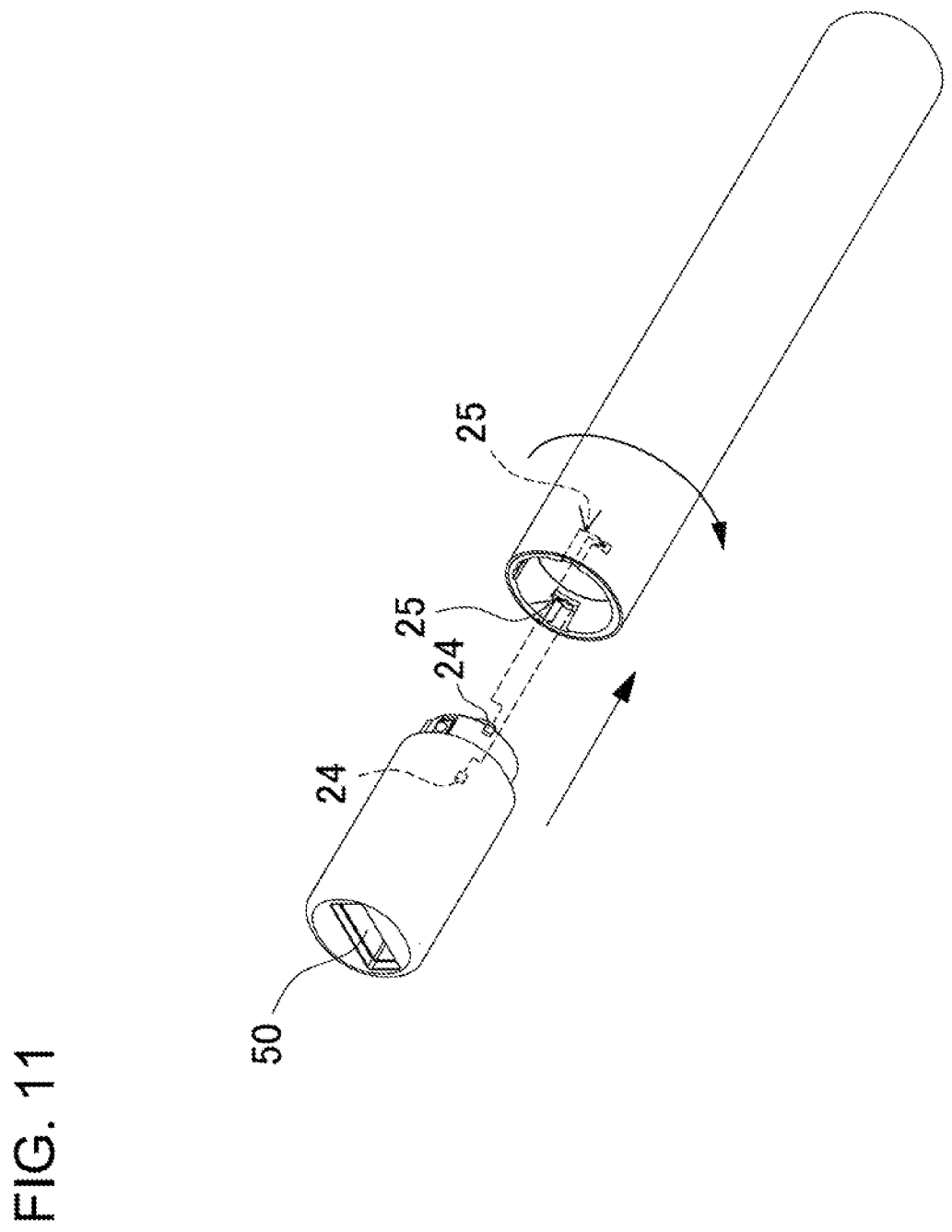
FIG. 11 is a perspective view showing an embodiment variation of the connecting structure.
Figure 12:
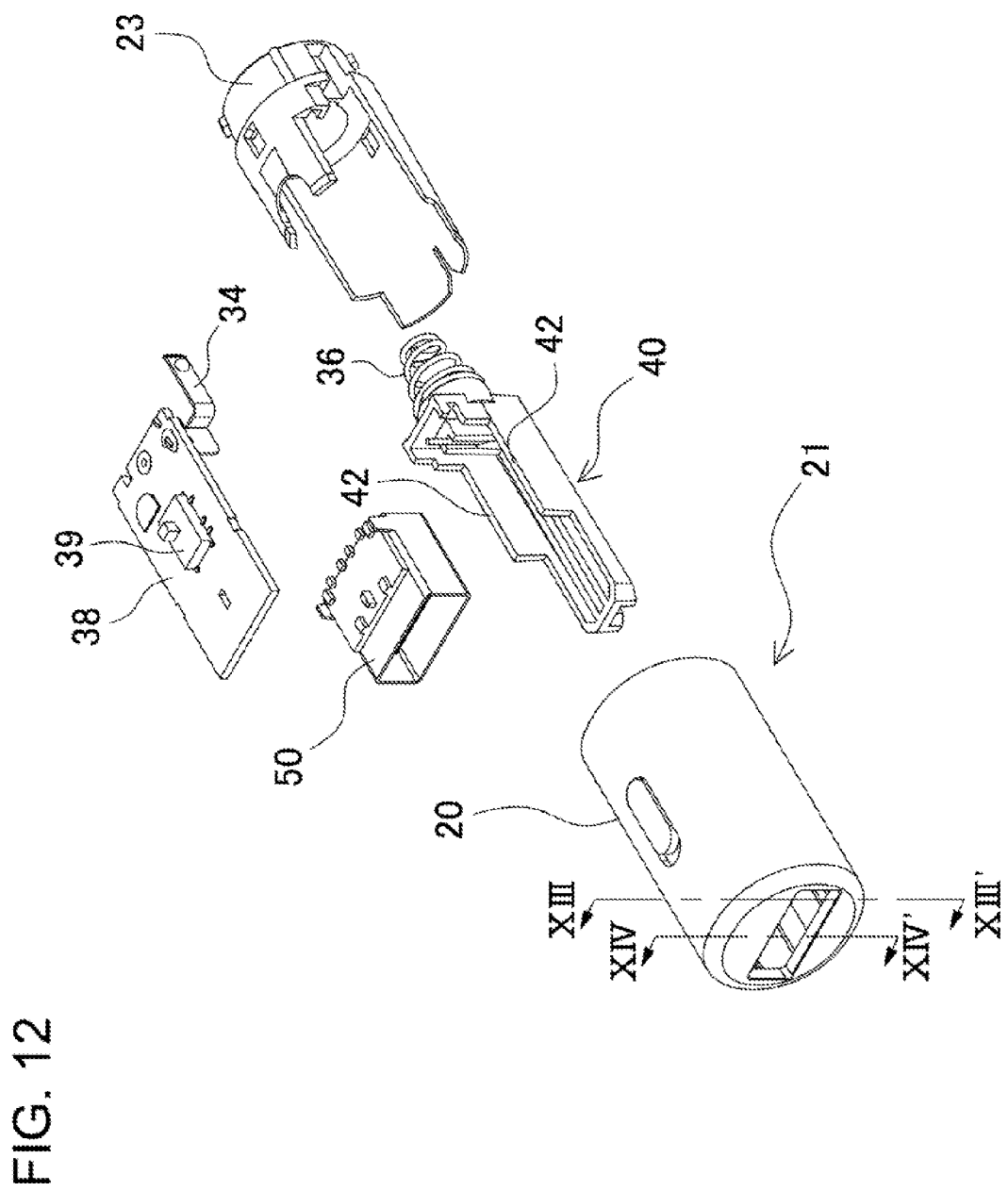
FIG. 12 is an exploded perspective view of the cap section.
Figure 13:
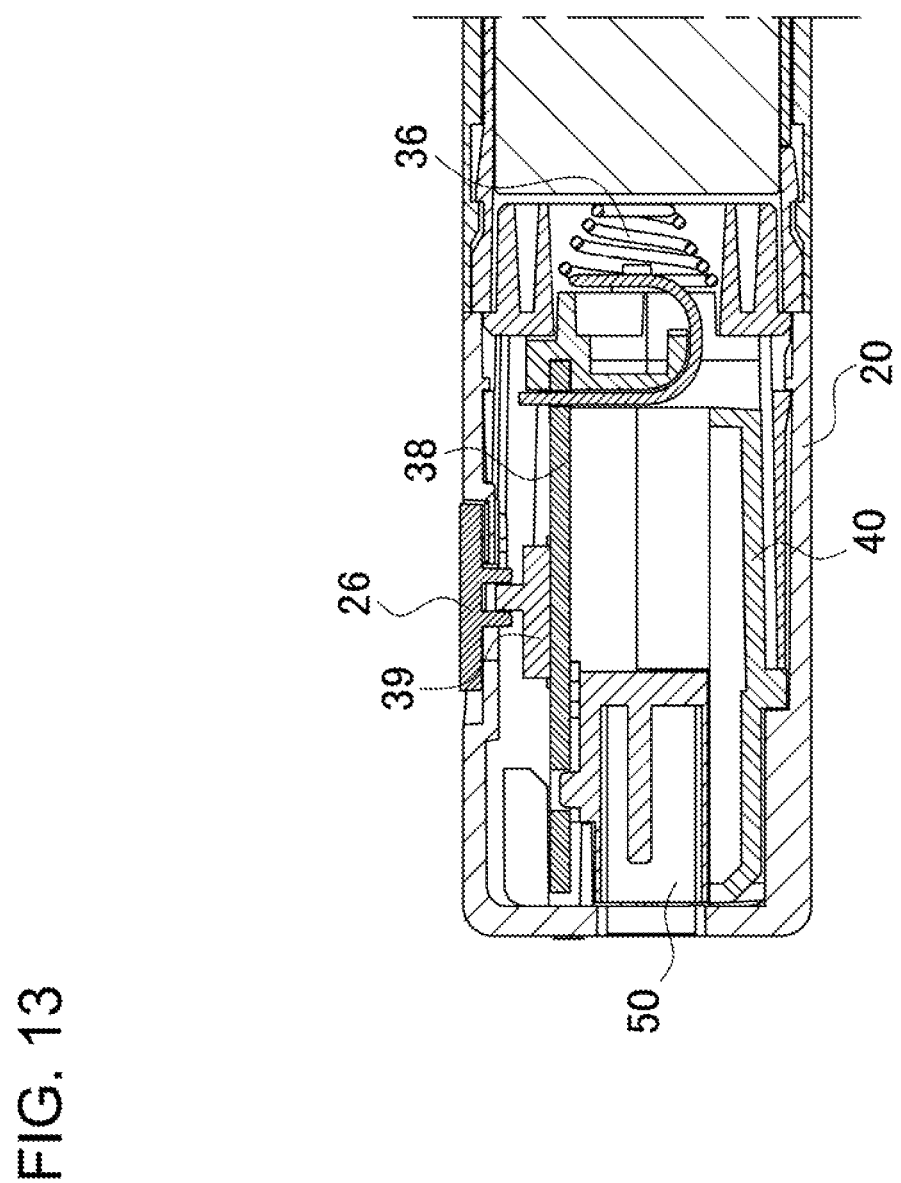
FIG. 13 is a vertical cross-section taken along line XIII-XIII of FIG. 12.
Figure 14:
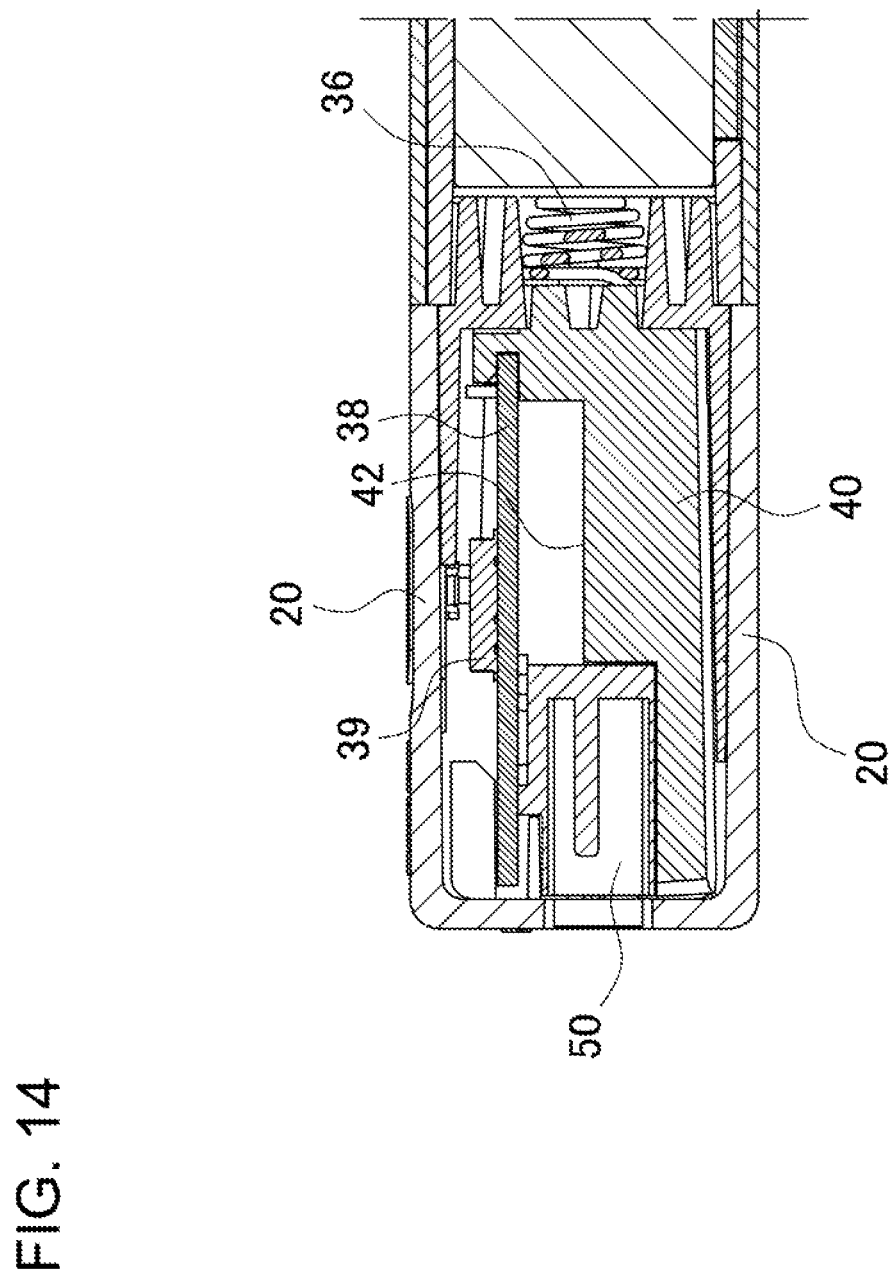
FIG. 14 is a vertical cross-section taken along line XIV-XIV of FIG. 12.

FIGS. 1-14 show a portable power source apparatus capable of holding circular cylindrical batteries for the first embodiment of the present invention. FIG. 1 is a perspective view showing a portable power source apparatus capable of holding circular cylindrical batteries for the first embodiment. FIG. 2 is an exploded perspective view of the portable power source apparatus of FIG. 1. FIG. 3 is a vertical cross-section taken along line III-III of FIG. 1. FIG. 4 is a vertical cross-section taken along line IV-IV of FIG. 3. FIG. 5 is a representative exploded view of FIG. 4. FIG. 6 is an exploded perspective view of the inner case. FIG. 7 is a perspective view showing the structure of the inner case inserted in the outer case. FIG. 8 is a vertical cross-section taken along line IV-IV of FIG. 3 for an embodiment variation. FIG. 9 is an exploded perspective view of the main case of FIG. 2. FIG. 10 is an exploded perspective view viewed from above and behind. FIG. 11 is a perspective view showing an embodiment variation of the connecting structure. FIG. 12 is an exploded perspective view of the cap section. FIG. 13 is a vertical cross-section taken along line XIII-XIII of FIG. 12. Finally, FIG. 14 is a vertical cross-section taken along line XIV-XIV of FIG. 12.

The portable power source apparatus capable of holding circular cylindrical batteries shown in these figures is made up of a main case 10 and a cap section 20. The main case 10 has a hollow circular cylindrical shape and can hold a plurality of circular cylindrical batteries CB inserted through the open end. The cap section 20 is attached to the open end of the main case 10 in a manner that closes-off the open end with circular cylindrical batteries CB loaded inside the main case 10. At this time, the series-connected circular cylindrical batteries CB are electrically connected to the circuit board 38 via a lead-plate 30. In addition, the voltage of the series-connected circular cylindrical batteries CB is converted to the specified voltage for output from the power supply terminal 50 by the voltage conversion circuitry mounted on the circuit board 38.

In the example of FIG. 2, the case is loaded with two AA batteries as the circular cylindrical batteries CB. However, it is also possible to use one battery or three or more batteries, and the batteries are not limited to AA batteries. AAA batteries or batteries larger than AA batteries can also be used.

As shown in FIG. 1, the cap section 20 is provided with a power supply terminal 50 in the end-plane and a power switch 26 on the upper surface. A plug PG on the electronic device ED is connected to the power supply terminal 50 and the power switch 26 is turned ON to begin supplying power to the electronic device ED. As a result, it is possible to operate the electronic device ED and/or charge the batteries housed in the electronic device ED.

In this portable power source apparatus 100, the overall length is constrained to a length equivalent to that of the two internal circular cylindrical batteries plus the length of the cap section 20. Further, the main case is constrained to a shape and size only slightly wider than the diameter of the circular cylindrical batteries CB miniaturizing the portable power source apparatus 100 to a small rod shape having the minimum necessary size. A miniaturized, light-weight apparatus is advantageous from the point of portability. Further, since this type of portable power source apparatus is carried on a daily basis, a well designed apparatus is required. In particular, a design commensurate with the sophisticated look of current portable electronic devices is in demand. A portable power source apparatus of the type shown in FIG. 1 with an elegantly simple rod-shaped design can satisfy this demand. The following sequentially describes each part of the portable power source apparatus in detail.

(Main Case 10)

As shown in FIGS. 2 and 3, the main case 10 is formed extending in the direction of the connected circular cylindrical batteries CB, having the shape of a circular cylinder with a bottom, and having an open end where circular cylindrical batteries CB can be inserted. The size of the main case 10 is minimized. The length is set according to the number of circular cylindrical batteries CB, and the inside diameter is a size that allows the circular cylindrical batteries CB to be smoothly inserted while avoiding any gaps that could permit the loaded circular cylindrical batteries CB to rattle. Here, the inside diameter, the outside diameter, and the total length are designed to just fit two AA batteries inside.

As shown in FIGS. 4-10, the main case 10 is made up of an inner case 12 and an outer case 11. Taking into account improved robustness and design quality, the outer case 11 is made of metal such as aluminum. The inner case 12 is formed from an insulating material to establish insulation of the circular cylindrical batteries CB contained inside. For example, the inner case 12 can be made of resin such as plastic. Further, the inner case 12 is divided into an upper case 13 and a lower case 14. Here, when the main case is divided into two parts, the two parts do not necessarily have to be divided evenly. For example, the inner case 12 shown in FIG. 6 has a cap section 20 attachment region that is implemented only by the upper case 13B, and other than this annular attachment region, the inner case 12 is essentially configured with an upper case 13B and a lower case 14B that divide the inner case 12 in half. With this configuration, the cap section 20 attachment region is a single-piece that can increase the strength of the connected attachment region to support loading forces and improve reliability.

As shown in FIGS. 4 and 5, the upper case 13 and lower case 14 connecting surfaces on one side (the left side in the cross-section views) are provided with interlocking ribs 15 that mate to connect the upper case 13 and lower case 14 edges. The edges on the other side (the left side in the cross-section views) have grooves 16 formed to insert the lead-plate 30. Consequently, the lead-plate 30 is retained in an orientation perpendicular to the connecting surfaces and is sandwiched within the inner case 12 via those connecting surfaces. By disposing the lead-plate 30 sandwiched inside the inner case 12, it can be serve as a reinforcing rib or boss to improve the strength of the inner case 12 connection. Further, with this structure, there is no need to allocate space to dispose the lead-plate 30 inside the inner case 12. This makes additional space within the main case 10 unnecessary and allows the portable power source apparatus to be miniaturized and made slender.

In this manner, the upper case 13 and the lower case 14 are joined using the lead-plate 30 as a supporting rib, and after forming the inner case 12, it is inserted into the open end of the outer case 11 to form the main case 10. As shown in FIGS. 4 and 7, the outer surface of the inner case 12 is provide with an insertion slit 18 extending along the lengthwise direction of the inner case 12, and the inside surface of the outer case 11 is provided with insertion projections 18B that insert into the insertion slit 18. With this structure, the inner case 12 is inserted and attached in the outer case 11 in an aligned manner.

One part of the lead-plate is left exposed from the inner case. In the example of FIGS. 4 and 5, one side-wall of the grooves 16 in the connecting surfaces of the upper case 13 and the lower case 14 (on the outside of the inner case in the figures) is formed shorter than the other side-wall. This forms a connecting surface slit 17 on the outside of the inner case 12, and the lead-plate 30 is exposed through that connecting surface slit 17. Suppose a slit happened to be formed on the inside of the inner case as a result of the manufacturing tolerances for upper case and lower case formation. Since a short circuit is possible due to unintentional contact of the lead-plate to the circular cylindrical batteries through that slit, this condition is undesirable. Therefore, by setting the dimensions to purposely form a slit on the outside of the inner case, the risk of forming an undesirable slit on the inside of the inner case is reduced and reliability is improved. Further, as shown in FIGS. 4 and 9, insulating sheet 19 is disposed in an intervening manner to avoid conduction between the lead-plate 30 and the metal outer case 11 through the connecting surface slit 17. However, in cases such as where the thickness of the inner case is enough to separate and insulate the lead-plate from the outer case, or where the potential of the outer case is put at negative ground (the lead-plate is connected to the negative electrode of the circular cylindrical batteries), the insulating sheet can be omitted.

Further, the insulating sheet can also be omitted for a configuration that does not establish a connecting surface slit partially exposing the lead-plate and completely buries the lead-plate inside the inner case. For example, in the embodiment variation shown in FIG. 8, the lead-plate is completely buried inside the inner case. By disposing the lead-plate 30 in a manner buried inside the inner case 12, insulation is established with respect to the outer surfaces of the circular cylindrical batteries and with respect to the metal outer case 11 to improve safety and reliability.

(Lead-Plate 30)

The lead-plate 30 electrically connects the circular cylindrical battery CB electrode that is furthest from the cap section 20 to the circuit board 38. The lead-plate 30 is made of a metal with superior electrical conducting properties, and for example, is made of copper or aluminum plate. In the example of FIGS. 9 and 10, the lead-plate 30 has the shape of a long narrow plate bent in an L-shape, and has one end (the right end in FIG. 9), which makes contact with the battery electrode, formed in a large rectangular shape as a contact piece 31. As described previously, the lead-plate 30 is embedded in the connecting surfaces of the upper case 13 and the lower case 14, and only the contact piece 31 protrudes outside. Therefore, as shown in FIG. 9, grooves 16 are formed along each edge of the upper case 13 and lower case 14, namely along the side surface and part of the bottom surface of the main case 10. Further, the other end of the lead-plate 30 (the left end in FIG. 9) has a circular locking hole 32 opened for mechanical and electrical connection to the cap section 20. This configuration allows the lead-plate 30 to interlock with a locking projection 35 established in the cap section 20. Here, the locking projection 35 and locking hole 32 configuration is simply one example of a connecting structure, and it should be clear that other connecting structures can also be adopted as applicable.

In the example shown in FIG. 11, a pair of rectangular locking pieces 24 are provided in diametrically opposed positions on the lateral surface of a cap section 20 connecting cylinder 23, and locking grooves 25 that guide insertion of the locking pieces 24 are provided at corresponding positions on the inside surface of the inner case 12. The locking grooves 25 bend in L-shapes and are established in diametrically opposed positions in the inner case 12. The L-shaped locking grooves 25 have feet that extend parallel to the circumferential direction of the inner case, and the foot of one L-shaped locking groove 25 is oriented upward while the foot of the other locking groove 25 is oriented downward. Consequently, as shown in FIG. 11, when the cap section 20 is inserted into the main case 10, each locking piece 24 is pushed to fit into each locking groove 25 and subsequently the cap section 20 is rotated (clockwise in FIG. 11) to advance each locking piece 24 along the bend in (the foot of) each locking groove 25. As a result, a locking mechanism is implemented, which adds rotational motion to pressing in the insertion direction, to achieve a dependable connecting structure. Here, it should be clear that the positions of the main case 10 lead-plate 30 and a corresponding lead connecting terminal 34 in the cap section 20 are designed in advance to align and electrically connect when the cap section 20 is rotated and locked in place in the main case 10. Further, as shown in FIG. 7, by displacing the positions of the locking grooves 25 approximately 90° away from the insertion slit 18 in the inner case 12, they are separated and do not interfere. In addition, there is no reduction in the strength due to local concentration of these types of grooves and slits that decrease the thickness of the inner case 12.

(Circular Cylindrical Batteries CB)

Currently existing batteries are used as the circular cylindrical batteries CB. Preferably, by using batteries that can be charged, those batteries can be used repeatedly by recharging. In particular, nickel hydride batteries are desirable, but other batteries such as nickel cadmium batteries and lithium ion batteries can also be used. In addition, off-the-shelf non-rechargeable batteries can also be used. For example, when there is no battery charge capacity or charge capacity is insufficient, widely available non-rechargeable batteries that are relatively easily acquired or purchased can be used for convenience.

Incidentally, the portable power source apparatus of the present embodiment is not provided with the capability of charging the rechargeable batteries and only functions to discharge the batteries. Therefore, battery recharging is performed using a widely available standard battery charger. However, it should be clear that battery charging capability can be added to the portable power source apparatus. In that case, charging circuitry that can provide the voltage necessary for battery charging is mounted on the circuit board 38, and an input terminal is provided that can accept external power for charging. By including these of additional parts, the outline of the portable power source apparatus becomes somewhat larger and increased cost is unavoidable. Therefore, these features are added depending on the demanded specifications and cost.

(Cap Section 20)

As shown in figures such as FIGS. 1 and 2, the cap section 20 has a circular cylindrical shape with essentially the same diameter as the main case 10, one end of the circular cylindrical cap section 20 is a closing surface 21 facing the open end of the main case 10, and the opposite end is an exposed surface 22 that is exposed to the outside. As described previously, a power switch 26 is provided on the lateral surface of the circular cylindrical cap section 20. A power supply terminal 50 is provided in the exposed surface 22, and a connecting structure is provided on the closing surface 21 to attach the cap section 20 to the open end of the main case 10 in a detachable manner.

(Connecting Structure)

To achieve a sufficiently robust connection while connecting the cap section 20 and the main case 10 in an essentially seamless circular cylindrical shape, the closing surface 21 of the connecting structure is provided with a contact surface that makes contact with the edges of the open end of the main case 10, and a connecting cylinder 23 stepped inside the contact surface projecting outward. As shown in FIG. 10, the side of the connecting cylinder 23 has a locking projection 35 that inserts into the previously described locking hole 32 in the end of the lead-plate 30. More specifically, the locking projection 35 is formed as a single unit with the metal lead connecting terminal 34 that is attached to the side of the connecting cylinder 23. Other than attaching the lead connecting terminal 34 on top of the connecting cylinder 23 side surface, a cut-out can be established in the side surface of the connecting cylinder 23 and the lead connecting terminal 34 can be disposed in that cut-out. Further, to make it easy to align the locking projection 35 with the locking hole 32, locking pieces 24 are preferably provided in positions separated from the locking projection 35 on the side surface of the connecting cylinder 23, and locking grooves 25 that guide the locking pieces 24 are formed in set locations corresponding to the locking pieces 24 in the inside surface of the main case 10, which is the inside surface of the inner case 12. The rotational position for attachment of the cap section 20 to the main case 10 is set by aligning the locking pieces 24 into the locking grooves 25, and this interlocks the locking projection 35 in the locking hole 32. The locking elements of the connecting structure are preferably pieces that can flexibly deform to fit together. Therefore, the inner case 12 and the connecting cylinder 23 are made of a material that can flexibly deform such as plastic. In addition, a plurality of locking pieces 24 can be provided. In the example of FIG. 10, locking pieces 24 are positioned essentially on the opposite side of the connecting cylinder 23 from the locking projection 35. Further, connection of the locking pieces with the locking grooves is not limited to that illustrated in FIG. 11. For example, with a locking piece inserted in a locking groove and used as a pivot, the cap section can be inclined with respect to the main case to insert the locking projection in the locking hole.

The end of the connecting cylinder 23 is provided with a flexible electrode terminal 36 that makes contact with an electrode at one end of the circular cylindrical batteries CB when the cap section 20 is attached to the main case 10. In the example of FIG. 10, the flexible electrode terminal 36 is a metal spring loaded to press flexibly against the circular cylindrical batteries CB. When the cap section 20 is attached, reliable electrical connection to the circular cylindrical battery CB electrodes is achieved as a result of the spring reaction force. In the example of FIGS. 2 and 3, two circular cylindrical batteries CB are inserted into the main case 10 with the protruding electrode first. The protruding positive electrode of the first circular cylindrical battery CB1 to be inserted contacts the contact piece 31 of the lead-plate 30, and the planar negative electrode of the second circular cylindrical battery CB2 to be inserted is contacted by the flexible electrode terminal 36. Since the negative electrode terminal of a circular cylindrical battery generally has more contact area than the positive electrode terminal, a spring is commonly used for the electrode terminal that contacts the negative electrode terminal. Consequently, by adopting the configuration described above, a spring can be disposed in the cap section 20 to main case 10 connecting structure, and dimension variation in the lengthwise direction of the circular cylindrical batteries can be absorbed by the spring. In addition, as a result of stress forces applied perpendicular to the locking elements of the connecting structure, frictional resistance is increased to effectively increase the reliability of the connection. Clearly this is only one example, and a configuration such as one that inserts the circular cylindrical batteries into the main case with the negative electrode first can also be adopted.

(Circuit Board 38)

The circuit board 38 is disposed inside the cap section 20. The circuit board 38 is a flat board made of glass epoxy with electronic components mounted on the surface to implement circuitry such as a circular cylindrical battery voltage conversion circuit. The voltage conversion circuit is advantageously implemented by a DC/DC converter that stabilizes and outputs circular cylindrical battery output voltage.

The circuit board 38 requires a certain amount of surface area to mount various electronic components, and there is a tendency for the area to be relatively large. Therefore, to allocate maximum surface area, the circuit board 38 is disposed along the diameter of a cross-section of the circular cylindrical cap section 20. Here, "disposed along the diameter" does not necessarily require exact alignment along the diameter of the cap section 20, and it is sufficient for the circuit board 38 to be parallel to the diameter. In particular, a power supply terminal 50 is established diametrically across the exposed region of the cap section 20. Depending on the type of power supply terminal 50, it may be mounted directly on the circuit board 38. Consequently, it may be necessary to slightly offset the circuit board 38 in a parallel manner from direct alignment with the diameter of the cap section 20. Therefore, as described above, there is no intent to precisely align the circuit board 38 with the diameter of a cross-section the cap section 20.

(Circuit Board Holder 40)

A circuit board holder 40 is provided in the cap section 20 to hold the circuit board 38. As shown in FIG. 12, the circuit board holder 40 supports the circuit board 38 and power supply terminal 50 on its upper surfaces and retains the flexible electrode terminal 36 on its backside. The circuit board holder 40 also establishes mechanical support for electrical connection of the flexible electrode terminal 36 and the lead-plate 30 to the circuit board 38. As shown in the cross-section view of FIG. 13, one end of the wire spring that forms the flexible electrode terminal 36 is bent in a U-shape and is directly connected to the circuit board 36. Consequently, no extra leads or wires are required for flexible electrode terminal 36 connection. The lead connecting terminal 34 that is provided with the locking projection 35 extends along the inside surface of the cap section 20 and bends inward to pass through the circuit board 38 for connection.

(Ribs 42)

Viewed from the front, the circuit board holder 40 has a rectangular box-shape and is disposed inside the cap section 20 in an upright orientation. Specifically, the circuit board holder 40 is disposed inside the cap section 20 extending in a direction approximately perpendicular to the plane of the circuit board 38. By orienting the circuit board holder 40 vertically with respect to the horizontally disposed circuit board 38, space inside the circular cylindrical cap section is efficiently allocated while increasing the strength of the cap section 20. Viewed from the side, the circuit board holder 40 has a stepped-shape with a pair of ribs 42 disposed in an upright manner with a stepped profile. The ribs 42 stand in an orientation essentially perpendicular to the backside of the circuit board 38. When the cap section 20 is exposed to external impact forces, damage to the cap section 20 can be prevented by the ribs 42. However, the ribs 42 do not function only as reinforcing pieces, and also serve to align the position of the power supply terminal 50. As shown in figures such as FIGS. 12-14, the ends of the ribs 42 have cut-outs to form a stepped profile and the power supply terminal 50 is supported on the bottom step. Further, the space formed between the pair of ribs 42 can be efficiently used to dispose large electronic components. For example, coils are relatively large electronic components and space is required to mount those components. Consequently, on the backside of the circuit board where ribs 42 are established to reinforce the cap section 20, these types of large electronic components can be disposed between the ribs 42 to efficiently utilize the space within the cap section 20.

Further, it is not necessarily a requirement for the tops of the ribs 42 to make contact with the surface of the circuit board 38. In particular, since various electronic components are mounted on the surface of the circuit board 38, there is a danger of damaging or short circuiting the electronic components by direct contact with the ribs 42. From the viewpoint of electronic component heat dissipation as well, some separation of the ribs 42 from the circuit board 38 is desirable.

(Power Supply Terminal 50)

By using a standardized power connector (with set specifications) for the power supply terminal 50, a large number of electronic devices that adopt those specifications can be supplied with power. In the first embodiment, an A-type USB terminal is used for the power supply terminal 50. Recently, electronic devices that use a USB terminal as a power supply port and connection adapters that support USB terminals have appeared in large numbers. Consequently, by using a USB terminal, many electronic devices can be supplied with power. Further, a B-type USB terminal can also be used.

The power supply terminal 50 is a rectangular opening approximately coincident with the diameter of the exposed region of the cap section 20. By essentially aligning the power supply terminal 50 with the diameter of the exposed region, the large opening can be disposed most efficiently within the circular exposed region. As a result, when an electronic device plug is inserted in the rectangular opening of the power supply terminal 50, depending on the shape of the electronic device, situations where the circular cylindrical portable power source apparatus 100 becomes unstable or rolls along the floor can be avoided. In particular, current electronic devices equipped with a USB terminal can have the USB connector established directly in the body of the device with no intervening cable or wires. For example, for an electronic device having a USB connector of the type that slides-out or extends outward for connection, the electronic device and portable power source apparatus can be connected as a unit by inserting the extended USB connector directly into the portable power source apparatus. Other than the case where the electronic device is a circular cylindrical shape, the connected unit will not roll on the supporting surface and can be stably placed even on a surface with somewhat of an incline.

(Power Switch 26)

A power switch 26 that controls the supply of power is provided on the lateral surface of the circular cylindrical cap section 20. In the example of FIG. 1, the power switch 26 is connected to a slide switch 39. As shown in FIGS. 12 and 13, the power switch 26 is configured to operate the button on the slide switch 39 mounted on the circuit board 38 through a switch window opened through the lateral surface of the circular cylindrical cap section 20. When the user switches the power switch 26 from OFF to ON, the supply of power from the power supply terminal 50 is initiated. When the power switch 26 is switched OFF, power supply is terminated. Consequently, power supply can be turned ON and OFF by operating the power switch 26.

(Second Embodiment)

Although the embodiment above describes a power supply terminal that is a USB terminal established directly in the exposed surface of the cap section, the present invention is not limited to that structure. For example, a standardized power supply terminal other than a USB terminal can be provided, or a terminal that is specially designed for a specific electronic device can also be provided. Or, this type of USB terminal or special-purpose terminal can be extended out from the exposed surface by a cable. With this type of structure, even an electronic device that is difficult to plug and unplug into the portable power source apparatus can be connected via a cable that allows more convenient handling. For example, to charge a mobile phone while it is inserted in a chest pocket, the rod-shaped portable power source apparatus is too bulky and inconvenient. However, it is possible to insert the portable power source apparatus into the inside pocket of suit coat or overcoat and connect it to the mobile phone via a cable.

Figure 15:
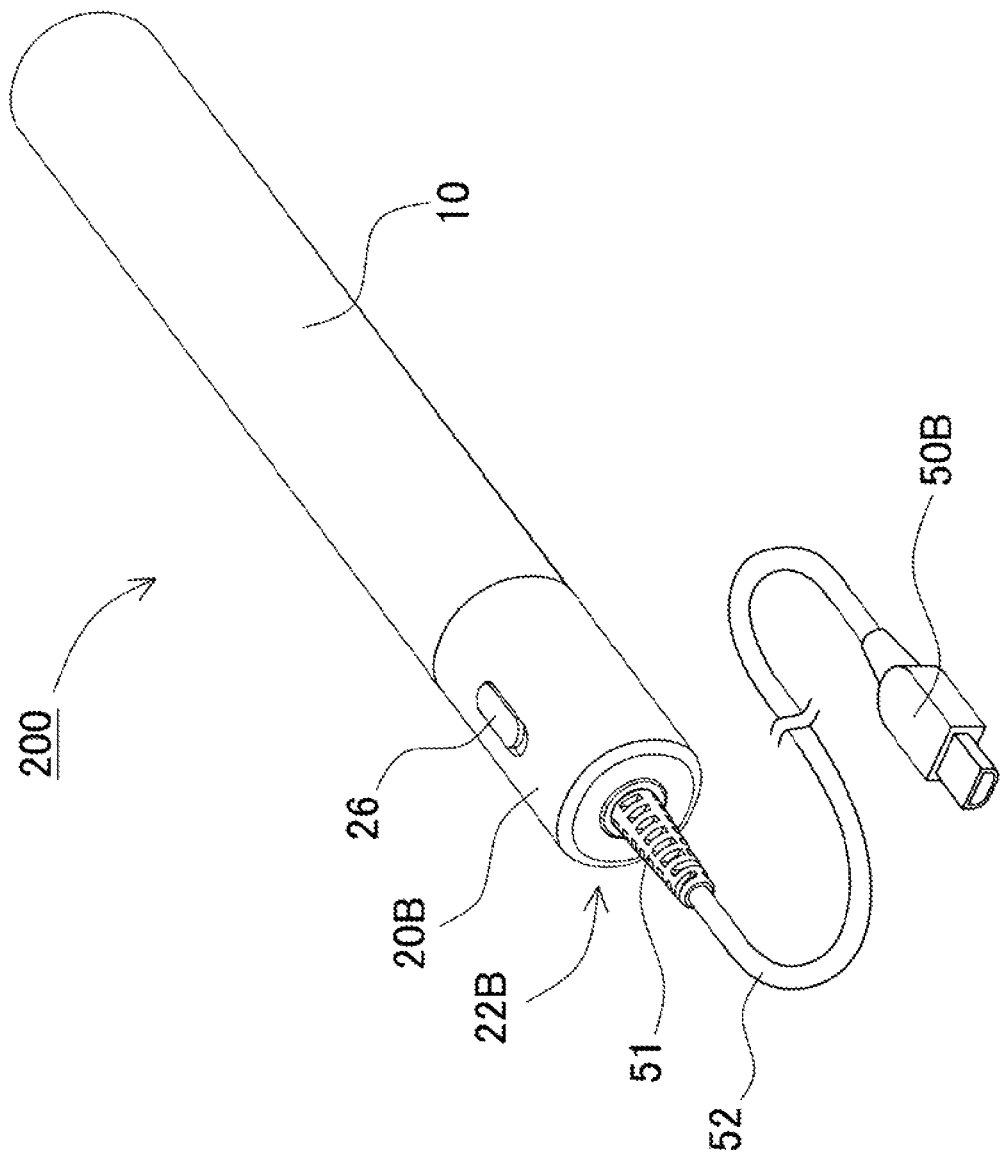
FIG. 15 is a perspective view of a portable power source apparatus for the second embodiment of the present invention.
Figure 16:
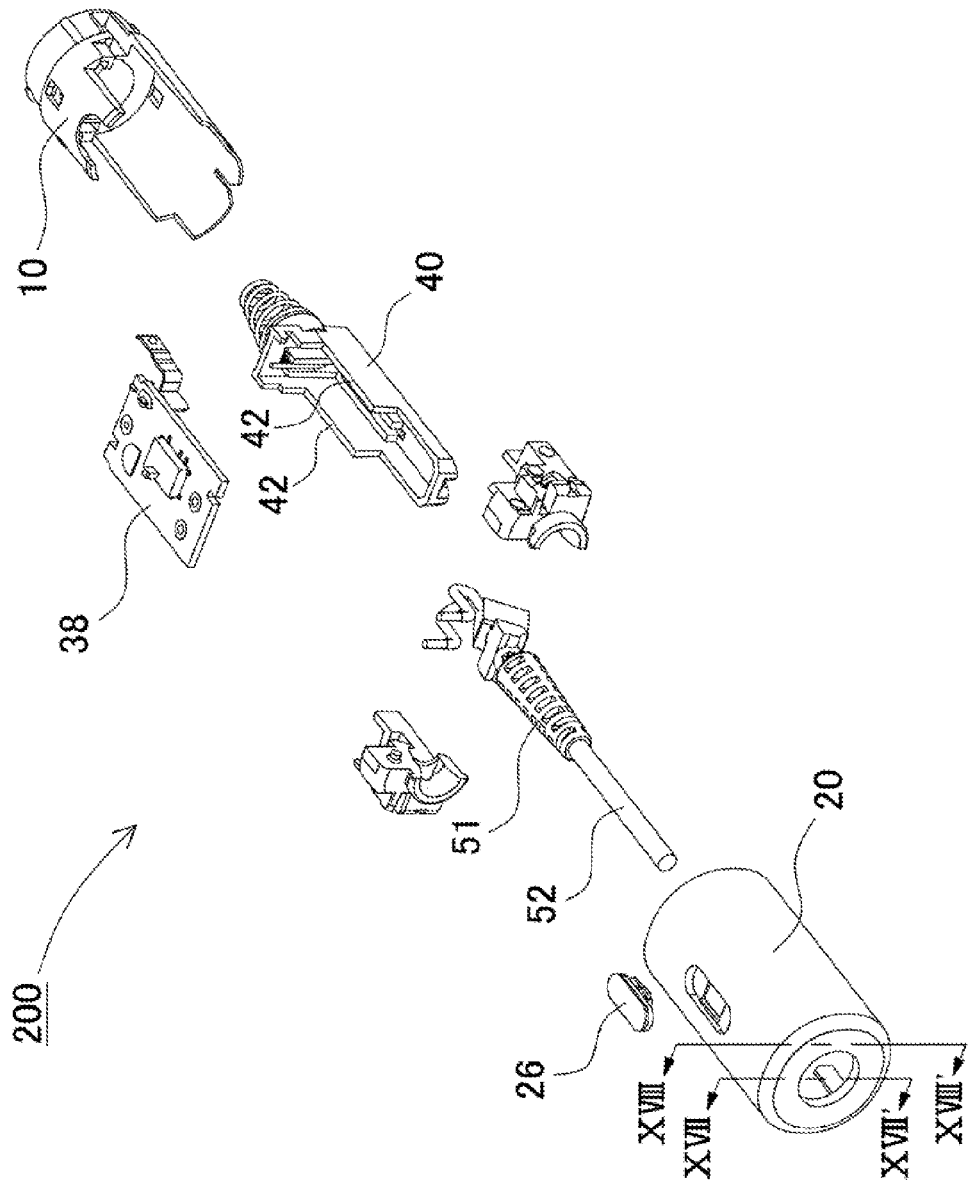
FIG. 16 is an exploded perspective view of the cap section of FIG. 15.
Figure 17:
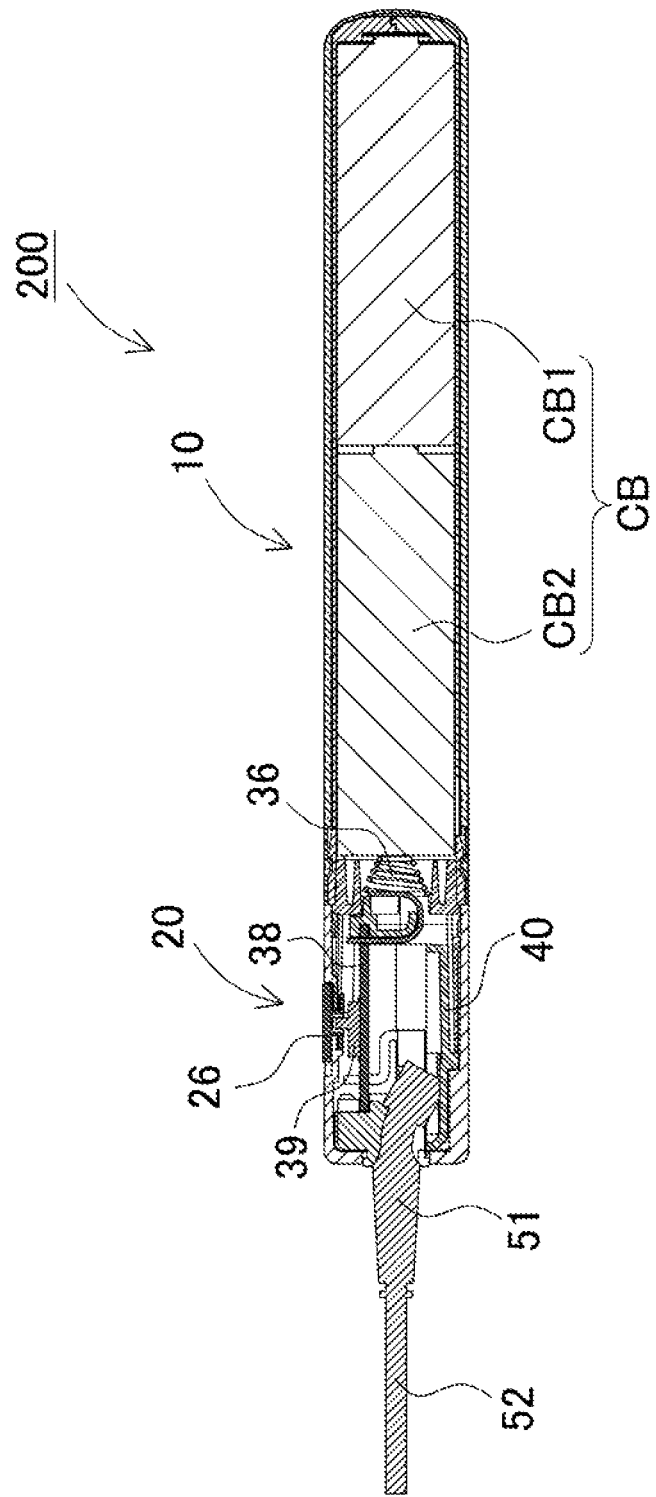
FIG. 17 is a vertical cross-section taken along line XVII-XVII of FIG. 16.
Figure 18:
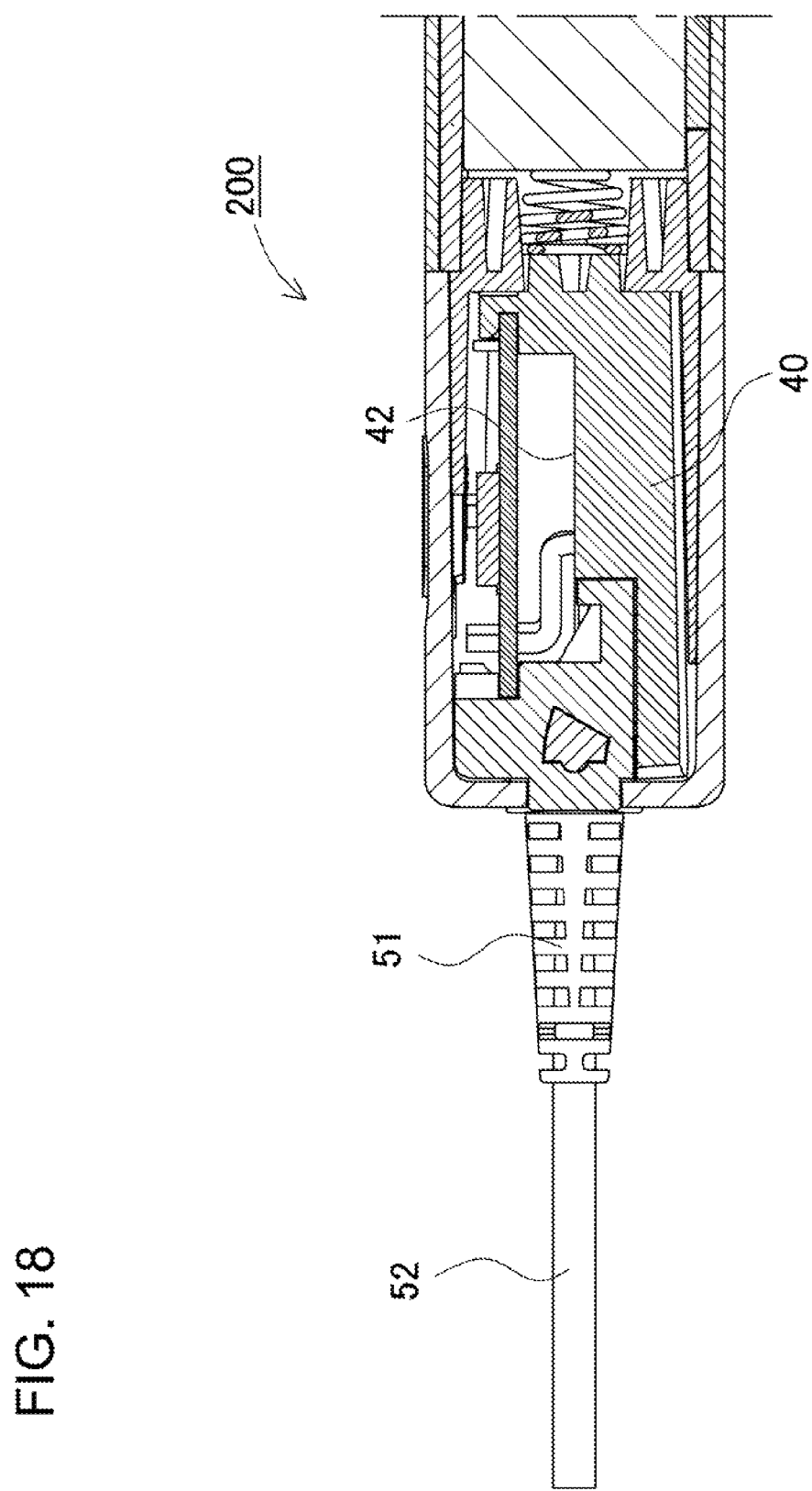
FIG. 18 is a vertical cross-section taken along line XVIII-XVIII of FIG. 16.

As an example of this type of structure, FIGS. 15-18 show a portable power source apparatus 200 for the second embodiment. FIG. 15 is an oblique view of a portable power source apparatus for the second embodiment. FIG. 16 is an exploded oblique view of the cap section of FIG. 15. FIG. 17 is a vertical cross-section through the line XVII-XVII of FIG. 16. Finally, FIG. 18 is a vertical cross-section through the line XVIII-XVIII of FIG. 16. In these figures, components common to the first embodiment have the same label and their description is abbreviated.

The main case 10 and the cap section 20B of the portable power source apparatus for the second embodiment essentially have the same basic configuration as in the first embodiment. However, the power supply terminal is a cable 52 connected to the exposed surface 22B of the cap section 20B via a tapered bushing 51 and a special-purpose power supply terminal 50B is provided at the end of the cable 52. As shown in the exploded oblique view of FIG. 16 and the cross-sections of FIGS. 17 and 18, the bushing 51 is attached to the end of the bottom-side of the circuit board 38 inside the cap section 20B. Space to dispose the relatively large bushing 51 inside the cap section 20B can preferably be allocated between or above the pair of ribs 42 on the circuit board holder 40. In this example, although the circuit board holder is the same as that of the first embodiment, a special-purpose circuit board holder can also be formed.

(Applicability in the Industry)

The portable power source apparatus capable of holding circular cylindrical batteries of the present invention uses standard batteries such as AA batteries or AAA batteries, and is appropriately applied as an emergency charger for devices such as mobile phones and portable music players, or as a charger to recharge an emergency charger.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2009-251556 filed in Japan on Oct. 31, 2009, the content of which is incorporated herein by reference.

What is claimed is:

1. A portable power source apparatus capable of holding circular cylindrical batteries comprising:
    a main case with a circular cylindrical shape open at one end and having a bottom, the main case being made with an outside diameter only slightly larger than a circular cylindrical battery, and capable of holding a plurality of circular cylindrical batteries that extend lengthwise, are stacked in the lengthwise direction, and are connected in series;
    a cap section with an approximately circular cylindrical shape that closes-off the open end of the main case in a detachable manner, the cap section being provided with a closing surface facing the open end of the main case and an exposed surface externally exposed at an end of the cap section that is opposite from the closing surface;
    a circuit board with a flat-board-shape housed in the cap section with voltage conversion circuitry for converting the voltage of the circular cylindrical batteries contained in the main case;
    a power supply terminal disposed in the exposed surface of the cap section and capable of outputting power from the circular cylindrical batteries contained in the main case; and a conducting lead-plate configured to contact the circular cylindrical battery electrode that is furthest away from the cap section to electrically connect the electrode to the circuit board, wherein the main case includes:
an inner case having an upper case and a lower case which are each formed from insulating material; and
an outer case covering an outside of the inner case, the outer case being made of metal, and wherein the lead-plate is retained at a junction of the upper case and the lower case in an orientation perpendicular to an interface plane of the junction, and the lead plate is inserted within a thickness of the inner case between an inner surface and an outer surface of the inner case in a non-contact manner with respect to curved surfaces of the circular cylindrical batteries and the outer case.

2. The portable power source apparatus capable of holding circular cylindrical batteries as cited in claim 1 wherein the circuit board is disposed diametrically across a circular cross-section of the cap section, and a pair of ribs is provided in an orientation approximately perpendicular to the circuit board.

3. The portable power source apparatus capable of holding circular cylindrical batteries as cited in claim 2 wherein a circuit board holder is provided inside the cap section to retain the circuit board in a set disposition, the circuit board holder has a box-shape that extends in a direction approximately perpendicular to the plane of the circuit board, and the circuit board holder is provided with said pair of ribs.

4. The portable power source apparatus capable of holding circular cylindrical batteries as cited in claim 1 wherein the power supply terminal is a standardized power supply connector.

5. The portable power source apparatus capable of holding circular cylindrical batteries as cited in claim 1 wherein the power supply terminal is a USB terminal.

6. The portable power source apparatus capable of holding circular cylindrical batteries as cited in claim 1 wherein the power supply terminal is a rectangular opening aligned along a diameter of the exposed surface.

7. The portable power source apparatus capable of holding circular cylindrical batteries as cited in claim 1 wherein the power supply terminal is a power supply connector extended from the exposed surface via a cable.

8. The portable power source apparatus capable of holding circular cylindrical batteries as cited in claim 1 wherein a power switch is provided on the lateral surface of the circular cylindrical cap section; and the power switch operates to begin supplying power from the power supply terminal at a voltage converted from voltage of the circular cylindrical batteries by the voltage conversion circuitry.

9. The portable power source apparatus capable of holding circular cylindrical batteries as cited in claim 1 wherein the voltage conversion circuitry mounted on the circuit board is a DC/DC converter that stabilizes and outputs voltage from the circular cylindrical batteries.

10. The portable power source apparatus capable of holding circular cylindrical batteries as cited in claim 1 provided with circular cylindrical batteries that can be charged.

11. The portable power source apparatus capable of holding circular cylindrical batteries as cited in claim 1 wherein the circular cylindrical batteries are AA batteries.

12. The portable power source apparatus capable of holding circular cylindrical batteries as cited in claim 1 wherein the cap section has a circular cylindrical shape with essentially the same diameter as the main case.

13. The portable power source apparatus capable of holding circular cylindrical batteries as cited in claim 3 wherein the circuit board holder is disposed inside the cap section in a manner extending in an upright direction.

14. The portable power source apparatus capable of holding circular cylindrical batteries as cited in claim 1 wherein the ends of the ribs have a stepped profile and the power supply terminal is supported in the stepped-down region.

15. The portable power source apparatus capable of holding circular cylindrical batteries as cited in claim 1 wherein the space formed between the pair of ribs is used to dispose electronic components.

16. The portable power source apparatus capable of holding circular cylindrical batteries as cited in claim 15 wherein the space formed between the pair of ribs is used to dispose coil elements that are electronic components.

17. The portable power source apparatus capable of holding circular cylindrical batteries as cited in claim 1 wherein the ribs are separated from a surface of the circuit board.

18. The portable power source apparatus capable of holding circular cylindrical batteries as cited in claim 1,
wherein a connecting surface slit is formed on an outside of the inner case in connecting surfaces of the upper case and the lower case, and the lead-plate is exposed through the connecting surface slit, the connecting surface slit being sealed by the outer case.

19. The portable power source apparatus capable of holding circular cylindrical batteries as cited in claim 18, further comprising an insulating sheet disposed between the connecting surface slit and the outer case, so that the lead plate is non-conducting with the outer case through the connecting surface slit.

20. The portable power source apparatus capable of holding circular cylindrical batteries as cited in claim 1,
wherein the inner case includes grooves that are respectively recessed inward from connecting surfaces of the upper case and the lower case within the thickness of the inner case, the grooves forming a space, and the lead-plate is inserted in the space within the thickness of the inner case.

* * * * *